A. HARRIS.
MASHING MACHINE.
No. 105,331.  Patented July 12, 1870.
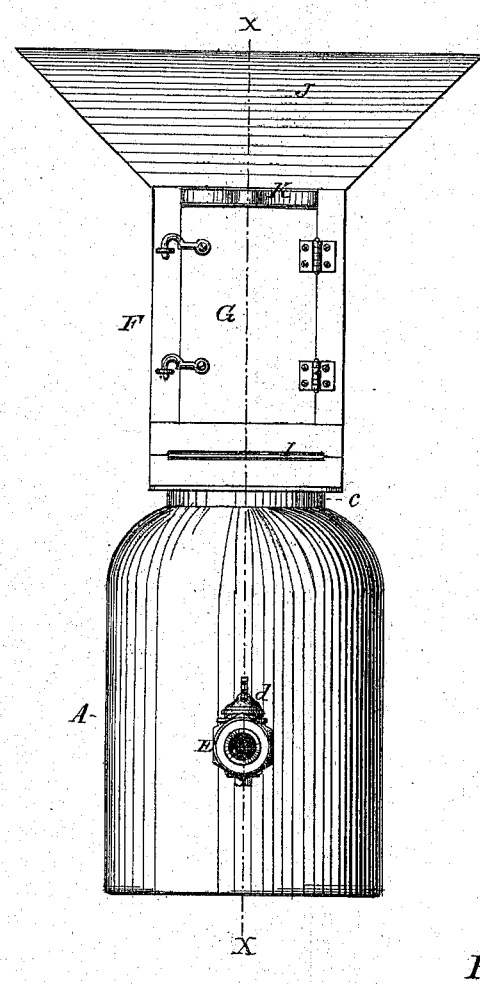
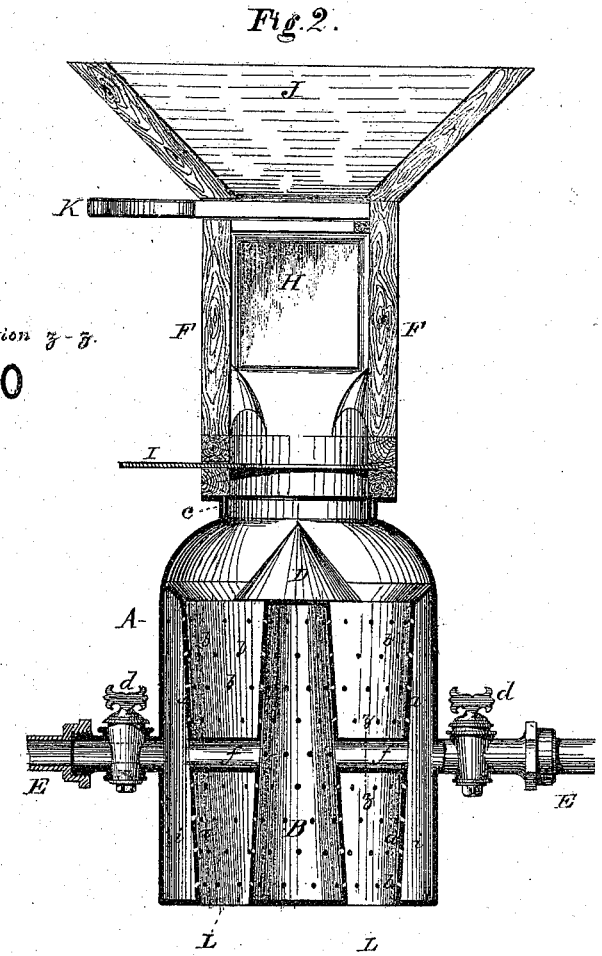
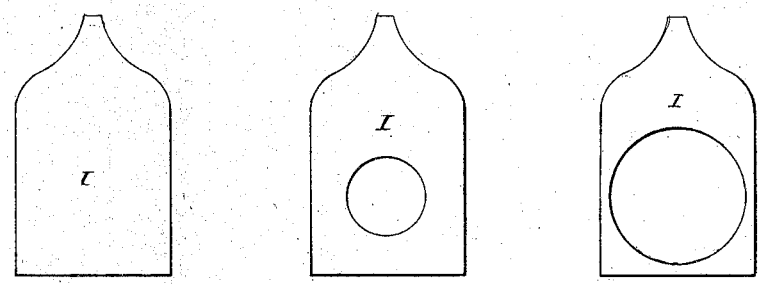
Witnesses:
Phil T. Dodge
E. J. Sommer
Inventor:
A. Harris
by Dodge & Munn
his attys

United States Patent Office.

ARTHUR HARRIS, OF NEW YORK, N. Y.

Letters Patent No. 105,331, dated July 12, 1870.

IMPROVEMENT IN MASHING-MACHINES.

The Schedule referred to in these Letters Patent and making part of the same

*To all whom it may concern:*

Be it known that I, ARTHUR HARRIS, of New York, in the county of New York and State of New York, have invented certain new and useful Improvements in Mashing-Machines; and I do hereby declare that the following is a full, clear, and exact description thereof, reference being had to the accompanying drawing making part of this specification, and to the letters of reference marked thereon, like letters indicating like parts wherever they occur.

To enable others skilled in the art to construct and use my invention, I will proceed to describe it.

My invention relates to mashing-machines for brewers; and

It consists in a novel manner of constructing an automatic machine for mixing the mash, whereby it can be made of a more uniform thickness than by any method heretofore practiced, and by which the thickness of the mash produced may be regulated at will.

In the drawing—

Figure 1 is a side elevation of my improved machine;

Figure 2 is a vertical cross-section of the same, taken on the line x x of fig. 1; and Figure 3 is a view of three of the feed-regulating slides.

A is a cylindrical metal vessel, made with double or hollow walls, and having its upper end drawn in, and formed with a neck, c.

The space between the edges of the inner and outer walls I close tightly, and perforate the inner wall, a, with a great number of very fine holes, b b, passing obliquely upward from the inside, as shown.

The opening down through the vessel I make smaller at the lower than at the upper end, as shown in fig. 2.

B is a tapering vessel, largest at its lower end, suspended within, and, at the center of the vessel A, by oval pipes, f, communicating with the space between the two walls of vessel A.

This vessel B, I also provide with fine perforations, with an upward inclination similar to those of the wall a.

D is a conical head or cap, secured to the top of the vessel B, to distribute the descending malt equally around in the annular space between the vessels A and B.

E are pipes communicating with the space in the hollow walls, and through which the hot water is forced into the space i and vessel B.

F is a box or chute, located on top of the vessel A, and provided with a door, G, and window, H, as shown.

I is a metal regulating slide, lying across the chute, and being provided with a circular opening, the size of which regulates the feed or flow of the malt.

J is a hopper to contain the malt, located on top of the chute, and provided with a slide, K, for closing its mouth.

In operating my device the hot water is forced in through the pipes E, filling the space i and vessel B, and discharging through their perforations, upward and outward, into the annular space L.

The slide K is then drawn out, and the malt from the hopper allowed to descend through the chute F and slide I, and strike upon cap D, which throws it outward into the space L, down through which it falls, becoming thoroughly mixed in its passage with the water, which is thrown among and against it, and is then discharged below in the form of a thoroughly mixed and homogeneous mash.

The pipes E are provided with cocks, d, by which to regulate or shut off the flow of water.

Each machine I provide with several of the slides I, having holes of different sizes, and with one slide having no opening, so that, by using one or another of these slides, the operator may regulate the flow of the malt, and thereby the thickness of the mash produced. By making the pipes f of an oval form, as shown, the accumulation of malt on top of them is prevented.

The glass window H affords the operator a convenient means for observing whether or not the malt is running down properly, and the door G a means for gaining access to the interior for any purpose.

When the machine is not in operation, the solid slide I is inserted to prevent the escape of steam.

By this manner of construction, dividing the water into a great many very fine streams, and giving these streams an upward direction, through and among the descending malt, I obtain a more thorough and satisfactory mash than can be produced by any other apparatus in use.

Having thus described my invention,

What I claim is—

1. A mashing-machine, having a conical perforated cylinder, B, arranged within a cylindrical vessel, A, provided with a perforated hollow wall, a, so as to leave a space between them, with downward inclining walls, substantially as herein described, for the purpose of allowing the water to be injected into and against the falling mash in opposite directions, as set forth.

2. In combination with the cylinder B, constructed and arranged as herein described, the conical cap D, mounted thereon. substantially as and for the purpose set forth.

3. The opening H, covered with glass or other transparent material, in the chute F, for the purpose of permitting the inspection of the interior during the discharge of the malt.

4. In combination with a mashing-machine, constructed as herein described, the slides I, having different sized openings for regulating the flow of the mash, as set forth.

5. The pipes E with their stop-cocks $d$, and connecting pipes $f$, in combination with the vessel A and cylinder B, when constructed and arranged for operation substantially as herein described, and for the purpose set forth.

ARTHUR HARRIS.

Witnesses:
D. M. CONNAC,
EUG. M. SMYSER.